United States Patent [19]
Hagino

[11] Patent Number: 6,118,919
[45] Date of Patent: Sep. 12, 2000

[54] VIDEO SIGNAL PROCESSOR

[75] Inventor: Hideyuki Hagino, Kumagaya, Japan

[73] Assignee: Kabushiki Kaisha Toshiba, Kawasaki, Japan

[21] Appl. No.: 08/925,148

[22] Filed: Sep. 8, 1997

[30] Foreign Application Priority Data

Oct. 8, 1996 [JP] Japan ................................. 8-267177

[51] Int. Cl.[7] .................................................. H04N 9/79
[52] U.S. Cl. .................................................. 386/1; 386/11
[58] Field of Search ............................. 386/1, 9, 10, 13, 386/11, 21, 25, 29, 26, 44; 360/64; H04N 9/79

[56] References Cited

U.S. PATENT DOCUMENTS

| | | | |
|---|---|---|---|
| 4,691,246 | 9/1987 | Miura et al. ........................... | 386/29 |
| 4,922,331 | 5/1990 | Ezaki ..................................... | 386/9 |
| 4,941,054 | 7/1990 | Muramoto ............................. | 386/25 |
| 5,543,926 | 8/1996 | Ezaki ..................................... | 386/25 |
| 5,761,370 | 6/1998 | Kim ....................................... | 386/25 |
| 5,812,348 | 9/1998 | Hwang .................................. | 360/64 |
| 5,841,934 | 11/1998 | Chielewski et al. .................. | 386/25 |

*Primary Examiner*—Huy Nguyen
*Attorney, Agent, or Firm*—Oblon, Spivak, McClelland, Maier & Neustadt, P.C.

[57] ABSTRACT

A luminous signal processing system, adapted for use in a home VTR, controls the frequency characteristic of a color signal trapping circuit in accordance with the level of a color signal component. The system widens the band of a luminous signal component, thereby improving the resolution. The system is provided with a circuit for extracting a luminous signal component from a video signal input to the recording system of the VTR, a frequency characteristic variable type color signal trapping circuit used for extracting a low-frequency carrier wave FM signal component and having a trapping frequency that varies in accordance with a control input, a circuit for extracting a color signal component from the video signal input, converting the extracted color signal component into a down-converted color signal, and extracting a down-converted color signal, a color signal level detecting circuit, adapted for the recording system, for detecting the level of a color signal included in the video signal input and supplying a detection output to the color signal trapping circuit as a control input, and an adder circuit for adding an output signal of the color signal trapping circuit and a down-converted color signal.

13 Claims, 5 Drawing Sheets

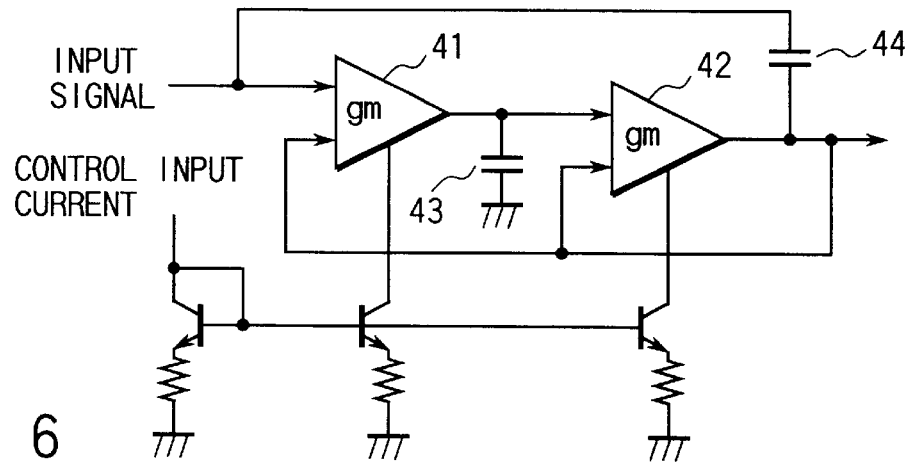
FIG. 6 COLOR SIGNAL TRAPPING CIRCUIT 13, 21
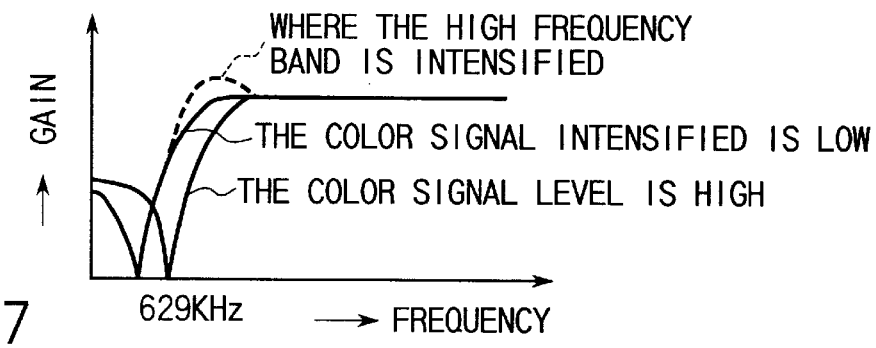
FIG. 7 FREQUENCY CHARACTERISTIC CURVE OF COLOR SIGNAL TRAPPING CIRCUIT OF FIG. 6
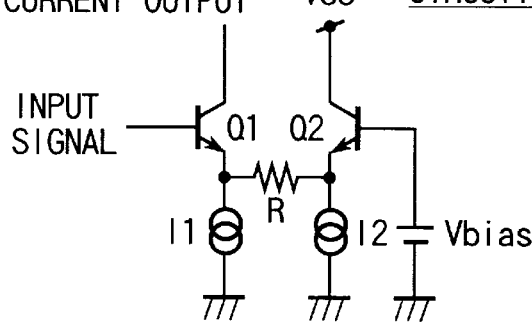
FIG. 8 MODIFICATION OF BINARY ENCODING CIRCUIT 33

VIDEO SIGNAL PROCESSOR

BACKGROUND OF THE INVENTION

The present invention relates to a video signal processor, more particularly to a control circuit for controlling a trapping circuit, which is employed in the luminous signal processing system of at least one of the recording and reproducing systems of a home video tape recorder (VTR) so as to remove down-converted color signal components from a low-frequency carrier wave FM signal.

FIGS. 11 and 12 shows parts of conventional recording and reproduction systems, respectively, which are incorporated in the video signal processing IC (integrated circuit) of a home VTR that records or reproduces television video signals of an NTSC system.

In the recording system shown in FIG. 11, the luminous signal (3.58 MHz) components separated from a video signal by means of a comb filter (not shown) are extracted from a video signal by means of the LPF of the luminous signal processing system. The extracted luminous signal components are supplied to an FM modulating circuit 82, by which they are converted into a low-frequency carrier wave FM signal. This low-frequency carrier wave FM signal is supplied to a color signal trapping circuit 83 so as to eliminate the band components of a down-converted color signal.

The output signal (low-frequency carrier wave signal) of the color signal trapping circuit and the output signal (the down-converted color signal) of the LPF 86 are added together into a composite signal, and this composite signal is recorded in videotape. At the time, the composite signal is recorded alternately in the adjacent two video tracks of the video tape by two video heads (not shown) provided for a rotatable cylinder (not shown).

In the playback system shown in FIG. 12, two playback signals reproduced from the video tape by the two video heads of the rotatable cylinder are amplified by a head amplifier (not shown), and are then alternately selected by a switcher circuit (not shown), thus obtaining a continuous signal. Thereafter, the continuous signal is supplied to the color signal trapping circuit 91 of the luminous signal processing system. The color signal trapping circuit 91 removes the down-converted color signal of 629 kHz from the continuous signal, thus extracting a low-frequency carrier wave FM signal.

The low-frequency carrier wave FM signal, thus extracted, is amplified by an FM signal AGC (automatic gain control) circuit (not shown) until it has a signal level required. In addition, the low-frequency carrier wave FM signal is suppressed in level variation. Thereafter, FM demodulation is performed by an FM demodulation circuit 92, thereby extracting the luminous signal component.

From the luminous signal component, FM signal carrier wave components are removed by use of an LPF 93. In addition, timing adjustment is made with respect to the luminous signal component. To be more specific, the signal transmission time is adjusted with reference to the color signal playback signal. Thereafter, the luminous signal component is supplied to an output amplifying circuit (not shown).

A playback signal output from a switcher circuit (not shown) is supplied to an LPF 94 of the color signal processing system, for the extraction of down-converted color signal components. Extracted down-converted color signal components are supplied to a frequency converting circuit 95. Owing to the frequency conversion performed by this circuit, the down-converted color signal components are converted into color signal components. These color signal components are extracted by a BPF 96.

In the conventional recording and reproducing systems mentioned above, the color signal trapping circuits 83 and 91 restricts the band of luminous signal components, without reference to the level of color signal components. Hence, the bandwidth of luminous signal components inevitably decreases, lowing the resolution.

Although not shown, an ACK (automatic color killer) circuit may be employed in the convention recording system shown in FIG. 11. In this case, the ACK circuit checks whether an input video signal includes a color burst signal, which serves as the phase difference of a color signal. If the color burst signal is not included, the low-frequency carrier wave FM signal output from the FM modulating circuit 82 is supplied directly to the adder circuit 87; it is not made to pass through the color signal trapping circuit 83 (through control). In this manner, the band of the luminous signal components is not restricted.

In the current broadcasting technology, however, the television signals of almost all television broadcasts include color burst signals. Even the television signals representing monochromatic images do include color burst signals. Therefore, even if the through control is performed for the color signal trapping circuit 83 in the ACK circuit, it is not necessarily useful.

BRIEF SUMMARY OF THE INVENTION

As described above, the luminous signal processing system incorporated in the conventional VTR recording/reproducing systems restricts the band of luminous signal components by means of a color signal trapping circuit, and this band restriction is executed without reference to the level of color signal components. Since, therefore, the bandwidth of luminous signal components decreases, the frequency characteristic of a luminous signal is degraded, and the resolution is adversely affected.

The present invention has been developed to provide a solution to the above problem, and the object of the present invention is to provide a video signal processor which is capable of controlling the frequency characteristic of a color signal trapping circuit in accordance with the level of a color signal component, widening the band of a luminous signal component, and thereby improving the resolution, and which is therefore suitable for use in the recording/reproducing systems of a home VTR.

A video signal processor provided by the present invention comprises: a first LPF for extracting a luminous signal component from a video signal input to the recording system of a VTR; an FM modulating circuit for converting the luminous signal component output from the first LPF into a low-frequency carrier wave FM signal; a color signal trapping circuit for extracting the low-frequency carrier wave FM signal component from an output signal of the FM modulating circuit, the color signal trapping circuit being of a frequency characteristic variable type wherein the trapping frequency varies in accordance with a control input; a BPF for extracting a color signal component from the video signal input; a down-converting circuit for converting the color signal component output from the BPS into a down-converted color signal; a second LPF for extracting the down-converted color signal from an output signal of the down-converted circuit; a color signal level detecting circuit, adapted for the recording system, for detecting the level of a color signal included in the video signal input and supplying a detection output to the color signal trapping circuit as a control input; and an adder circuit for adding an output signal of the color signal trapping circuit and an output signal of the second LPF together, and supplying a signal obtained thereby to a video head of the VTR. The color signal level detecting circuit may convert the level of the color signal component into binary data; and the color signal trapping circuit of the frequency characteristic variable type may have a trapping frequency which varies to a frequency of the down-converted color signal or a lower frequency in accordance with the binary data output from the color signal level detecting circuit. The video signal processor may further comprise a comb filter for separating the video signal input into a luminous signal component and a color signal component, in which a separated color signal output produced from the comb filter may be used as a color signal input of the color signal level detecting circuit. The video signal processor may further comprise a fourth filter serving as a high-pass filter and inserted between an output terminal of the FM demodulation circuit and the color signal trapping circuit, in which the fourth filter may be controlled on the basis of a detection output of the color signal level detecting circuit when the color signal level detecting circuit has a low color signal detection level, such that a gain of the fourth filter increases approximately at a cutoff frequency.

A video signal processor also provided by the present invention comprises a color signal trapping circuit for extracting a low-frequency carrier wave FM signal component from a playback signal input of a playback system of a VTR, the color signal trapping circuit being of a frequency characteristic variable type wherein a trapping frequency varies in accordance with a control input; an FM demodulation circuit for FM-demodulating the low-frequency carrier wave FM signal component output from the color signal trapping circuit; a first LPF for extracting a luminous signal component from an output signal of the FM demodulation circuit; a second LPF for extracting a down-converted color signal from the playback signal input; a frequency converting circuit for converting an output signal of the second LPF into a color signal; a BPF for extracting a color signal from an output signal of the frequency-converting circuit; and a color signal level detecting circuit, incorporated in a playback system, for detecting the level of the color signal and supplying a detection signal obtained thereby to the color signal trapping circuit as a control input. The color signal level detecting circuit may convert the level of the color signal into binary data; and the color signal trapping circuit of the frequency characteristic variable type may have a trapping frequency which varies to a frequency of the down-converted color signal or a lower frequency in accordance with the binary data output from the color signal level detecting circuit. The video signal processor may further comprise: a comb filter connected to an output terminal of the frequency conversion circuit, in which a separated color signal output produced from the comb filter may be used as a color signal input of the color signal level detecting circuit. A video signal processor may further comprise: a fourth filter a fourth filter serving as a band pass filter and inserted between an output terminal of the color signal trapping circuit and the frequency converting circuit, in which the fourth filter may be controlled on the basis of a detection output of the color signal level detecting circuit when the color signal level detecting circuit has a low color signal detection level, such that a cutoff frequency corresponding to a band of the fourth filter decreases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a block circuit diagram showing an example of a color signal trapping circuit employed in the IC portion of the recording system shown in FIG. 1 or the IC portion of the playback system shown in FIG. 2.

FIG. 7 is a graph showing an example of a frequency characteristic that the color signal trapping circuit shown in FIG. 6 has.

FIG. 8 is a circuit diagram showing a modification of the binary encoding circuit shown in FIG. 4.

DETAILED DESCRIPTION OF THE INVENTION

Embodiments of the present invention will now be described in detail with reference to the accompanying drawings.

Figure 1:
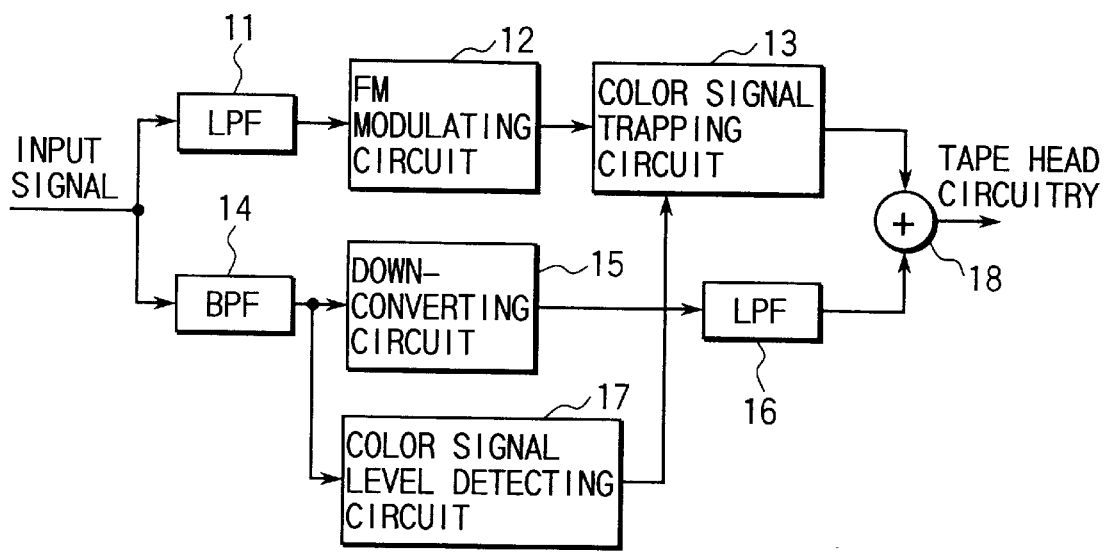
FIG. 1 is a block circuit diagram showing part of the recording system of a video signal-processing IC included in a home VTR which incorporates a video signal processor according to the first embodiment of the present invention.

FIG. 1 are block circuit diagrams respectively showing, in part, the recording and playback systems of a video signal-processing IC included in a home VTR which incorporates a video signal processor according to the first embodiment of the present invention.

In the recording system IC portion shown in FIG. 1, a luminous signal component, which is separated from an NTSC-type video signal input by means of a comb filter (not shown), is extracted by a LPF (low-pass filter) 11, and is then input to an FM modulating circuit 12, for conversion into a low-frequency carrier wave FM signal. This low-frequency carrier wave FM signal is supplied to a color signal trapping circuit 13, which is of a frequency characteristic variable type. The color signal trapping circuit 13 removes the bandwidth components of a down-converted color signal from the low-frequency carrier wave FM signal.

The frequency characteristic variable type color signal trapping circuit 13 is designed to vary the trapping frequency in accordance with a control input. For example, the trapping frequency is varied to 629 kHz or a predetermined frequency lower than that in accordance with the logical level of a binary input, for example.

A color signal component (3.58 MHz) separated from the video signal input by means of the comb filter (not shown) is extracted by a BPF (band pass filter) 14, and is then supplied to a down-converting circuit 15, for conversion into a signal having a frequency lower than that of the low-frequency carrier wave signal. As a result, a down-converted color signal whose carrier wave is 629 kHz is obtained. The down-converted color signal is extracted by means of the LPF 16.

The output signal of the BPF 14 is also supplied to the color signal level detecting circuit 17 of the recording system. By this circuit, the level of the color signal component is detected, and the resultant detection output is supplied to the color signal trapping circuit 13 of the frequency characteristic variable type as a control input.

Thereafter, the output signal of the color signal trapping circuit 13 (namely, low-frequency carrier wave FM signal) and the output signal of the LPF 16 (namely, a down-converted color signal) are added together by an adder circuit 18. The resultant composite signal is magnetically recorded in a videotape. At the time, the composite signal is recorded in the adjacent two tracks of the videotape by means of two video heads (not shown) provided for a rotatable cylinder (not shown).

Figure 2:
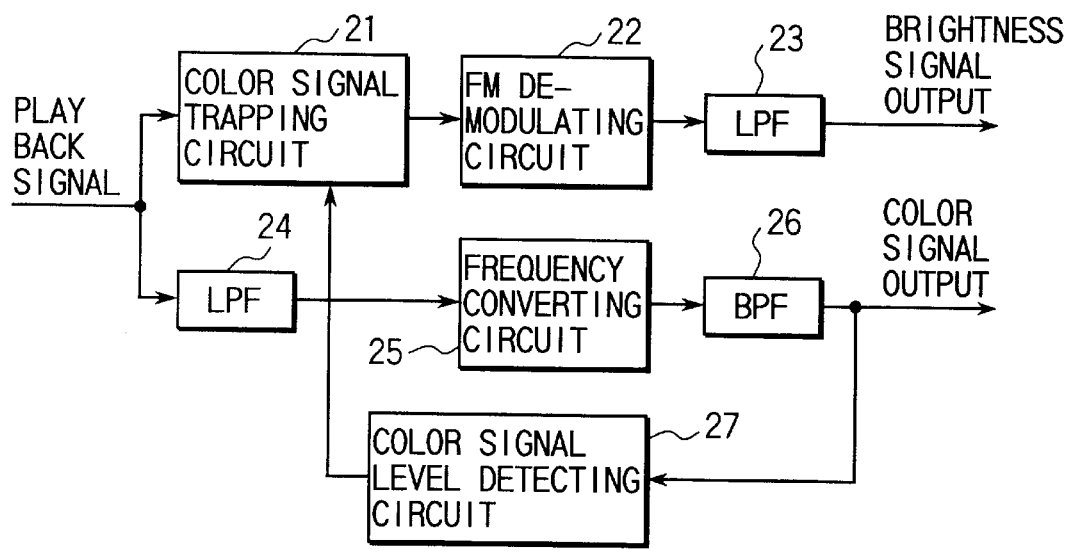
FIG. 2 is a block circuit diagram showing part of the playback system of the video signal-processing IC included in the home VTR which incorporates the video signal processor according to the first embodiment of the present invention.

In the IC portion of the playback system shown in FIG. 2, two playback signals, which are reproduced from the videotape by means of the two video heads provided for the rotatable cylinder, are first amplified by a head amplifier (not shown), and are then alternately selected by means of a switcher circuit (not shown), thus producing a continuous signal. The continuous signal is supplied to a color signal trapping circuit 21 of a frequency characteristic variable type. The color signal trapping circuit 21 removes the down-converted color signal of 629 kHz from the continuous signal, thereby extracting the low-frequency carrier wave FM signal that includes a luminous signal component.

The frequency characteristic variable type color signal trapping circuit 21 is designed to vary the trapping frequency in accordance with a control input. For example, the trapping frequency is varied to 629 kHz or a predetermined frequency lower than that in accordance with the logical level of a binary input, for example.

Normally, a low-frequency carrier wave signal output from the color signal trapping circuit 21 is supplied to a dropout compensation circuit (not shown), and then to an FM signal AGC circuit (not shown). After being amplified to the necessary signal level, the low-frequency carrier wave signal is applied to a limiter circuit (not shown), for suppression of level variations. Thereafter, the low-frequency carrier wave signal is supplied to an FM demodulating circuit 22, for FM demodulation.

An output signal from this FM demodulation circuit 22 is supplied to a LPF 23. This LPF removes carrier wave components from the FM signal, thus extracting a luminous signal component. In addition, the LPF 23 makes timing adjustment so that the transmission time becomes optimal with reference to the color signal playback system. The extracted luminous signal component is supplied to an output amplifier circuit (not shown).

A playback signal output from the switcher circuit (not shown), i.e., the continuous signal mentioned above, is also supplied to an LPF 24, for extraction of a down-converted color signal component. The down-converted color signal component is supplied to a frequency converting circuit 25, for frequency conversion. A color signal component, produced by this frequency conversion, is extracted by a BPF 26.

An output signal from the BPF 26 is not only used as a color signal output but also supplied to a color signal level detecting circuit 27 of the playback system. The color signal level detecting circuit 27b detects the level of a color signal component, and the resultant detection output is supplied to the color signal trapping circuit 21 of the frequency characteristic variable type as a control input.

In the recording and playback systems mentioned above, the frequency characteristics of the color signal trapping circuits 13 and 21 can be controlled in accordance with the levels of the color signal components.

To be more specific, the color signal trapping circuits 13 and 21 can remove a down-converted color signal of 629 kHz during the period in which the color signal components are high in level (a color burst signal period in the case of a monochromatic broadcast).

On the other hand, during the period in which the color signal components are low in level (a test pattern period in the case of a monochromatic broadcast), the trapping frequencies of the color signal trapping circuits 13 and 21 are lowered. As a result, the bandwidth of the luminous signal components is increased, the frequency characteristics of the luminous signal components are improved, and the resolution is enhanced.

Figure 3:
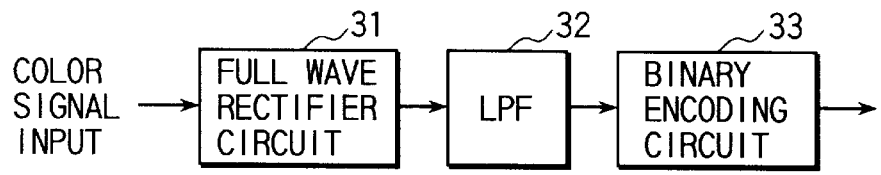
FIG. 3 is a block circuit diagram showing an example of a color signal level detecting circuit employed in the IC portion of the recording system shown in FIG. 1 or the IC portion of the playback system shown in FIG. 2.

FIG. 3 is a block circuit diagram showing an example of a manner in which the color signal level detecting circuit 17 in FIG. 1 and the color signal level detecting circuit 27 in FIG. 2 are designed.

The color signal level detecting circuit comprises a full wave rectifier circuit 31, an LPF 32 for smoothing a pulsating output from the full wave rectifier circuit 31, and a binary encoding circuit 33 for binary-encoding the output voltage of the LPF 32.

Figure 4:
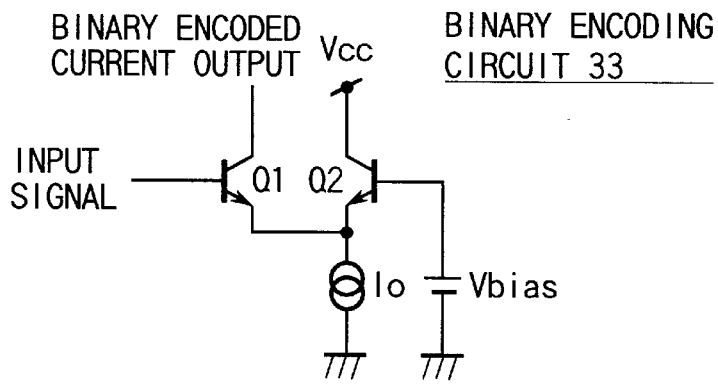
FIG. 4 is a circuit diagram showing an example of a binary encoding circuit employed in the color signal level detecting circuit shown in FIG. 3.

FIG. 4 is a circuit diagram showing an example of a manner in which the binary encoding circuit 33 of the color signal level detecting circuit shown in FIG. 3 is designed.

As shown in FIG. 4, the binary encoding circuit 33 comprises a first NPN transistor Q1 and a second NPN transistor Q2. An input signal is supplied to the base of the first NPN transistor Q1, and a bias voltage Vbias is applied to the base of the second NPN transistor Q2. The emitters of the first and second NPN transistors Q1 and Q2 are connected together and are led to a grounded node by way of a current source Io.

A power supply voltage (Vcc) is applied to the collector of the second NPN transistor Q2, and a binary encoded current output is picked up from the collector of the first NPN transistor Q1. The binary encoded current output is produced by processing the input signal with reference to the bias voltage.

Figure 5:
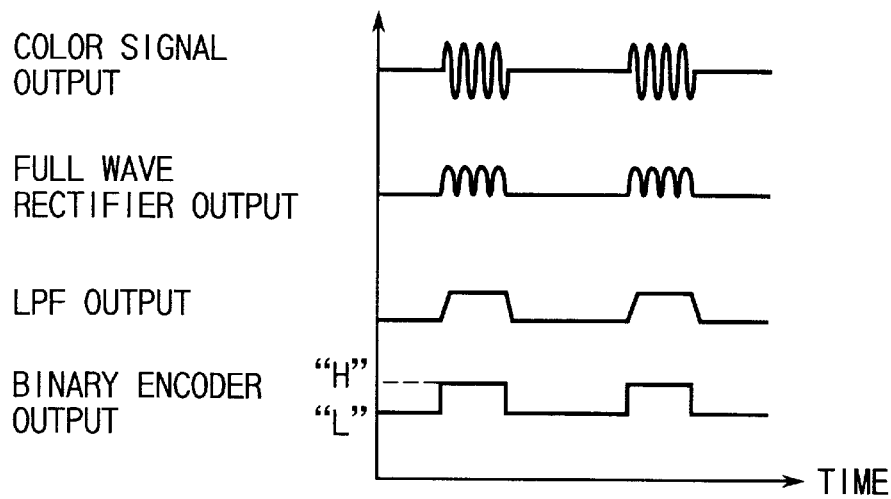
FIG. 5 is a waveform chart showing waveforms of the color signal level detecting circuit shown in FIG. 3.

FIG. 5 is a waveform chart showing waveforms of the color signal level detecting circuit depicted in FIG. 3.

As can be seen from FIG. 5, the output signal of the binary encoding circuit 33 is "L" in logical level when the level of the color signal component is smaller than the predetermined level, and is "H" in logical level when the level of the color signal component is larger than the predetermined value.

FIG. 6 is a block circuit diagram showing a manner in which the color signal trapping circuit 13 employed in the recording system shown in FIG. 1 and the color signal trapping circuit 21 of the playback system shown in FIG. 2 are designed. FIG. 7 is a graph showing an example of a frequency characteristic that the color signal trapping circuit shown in FIG. 6 has.

The color signal trapping circuit shown in FIG. 6 is, for example, a combination circuit made up of an LPF and an HPF. The LPF comprises a variable-gm circuit 41 (gm: a mutual conductance) and a capacitor 43; likewise, the HPF comprises variable-gm circuit 42 (gm: a mutual conductance) and a capacitor 44. When the amount of current supplied from the current source to the variable-gm circuits 41 and 42 varies in accordance with the control input current, the cutoff frequency of the LPF and that of the HPF varies in the same direction, thereby changing the trapping frequencies.

To be more specific, as shown in FIG. 6, the trapping frequencies can be varied to 629 kHz or predetermined frequencies lower than that by varying the control input current (i.e., the binary encoded current output from the color signal level detecting circuits).

If the color signal level detecting circuit shown in FIG. 3 is designed such that the output signal of the binary encoding circuit 33 smoothly changes between "L" and "H" (i.e., the gradient of change is smooth), the control inputs to the variable-gm circuits 41 and 42 shown in FIG. 6 varies smoothly. Hence, the trapping frequencies are allowed to vary continuously between 629 kHz and the predetermined frequency lower than that.

FIG. 8 shows an example of a binary encoding circuit capable of operating in the manner mentioned in the preceding paragraph.

In the binary encoding circuit shown in FIG. 8, the base of the first NPN transistor Q1 receives an input signal, and the emitter thereof is connected to a grounded node by way of a current source I1. The base of the second NPN transistor Q2 is applied with a bias voltage Vbias, and the emitter thereof is connected to a grounded node by way of a second current source I2. A resistor element R is inserted between the emitters of the two transistors Q1 and Q2.

In the color signal level detecting circuits 17 and 27 of the recording and playback systems shown in FIGS. 1 and 2, the input signal-pickup points (i.e., signal line-branching points) are not limited to those described in the foregoing embodiments. Any points can be used as input signal-pickup points as long as a color signal can be picked up therefrom.

Figure 9:
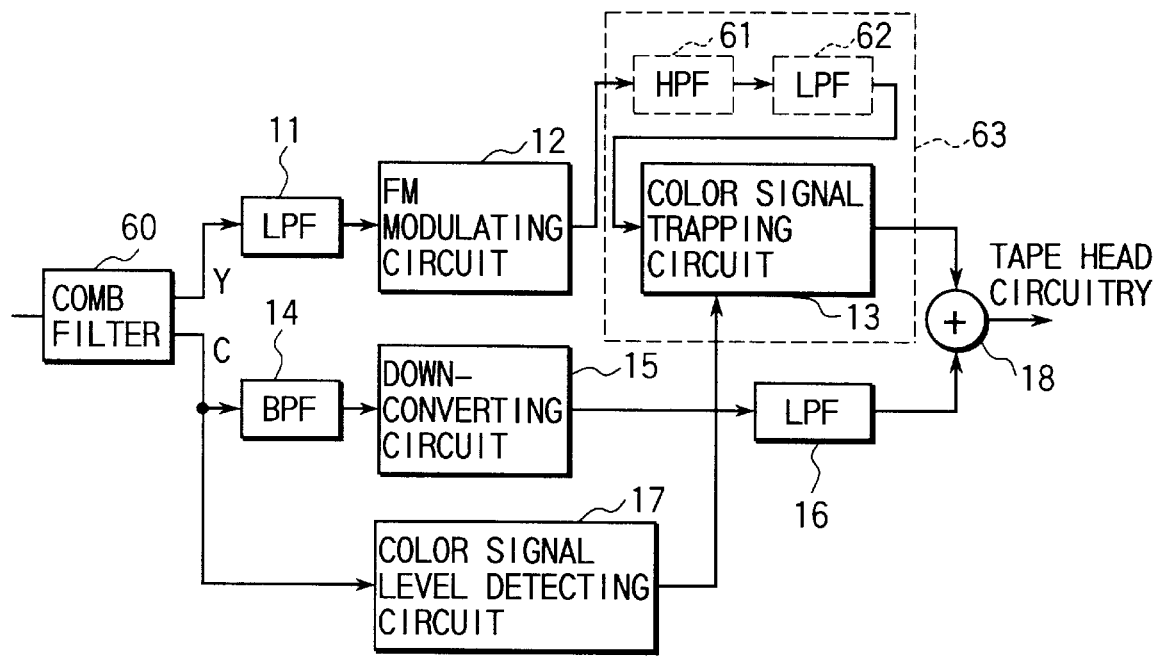
FIG. 9 is a block circuit diagram showing a modification of the circuit depicted in FIG. 1, the block circuit diagram showing part of the recording system of the video signal-processing IC of a home VTR, which employs a video signal processor according to the second embodiment of the present invention.

In the recording system, a comb filter 60 is normally connected to the input terminals of the LPF 11 and BPF 14, as shown in FIG. 9. One of the color signal outputs C separated by this comb filter 60 may be supplied to the color signal level detecting circuit 17, as shown in FIG. 9.

Figure 10:
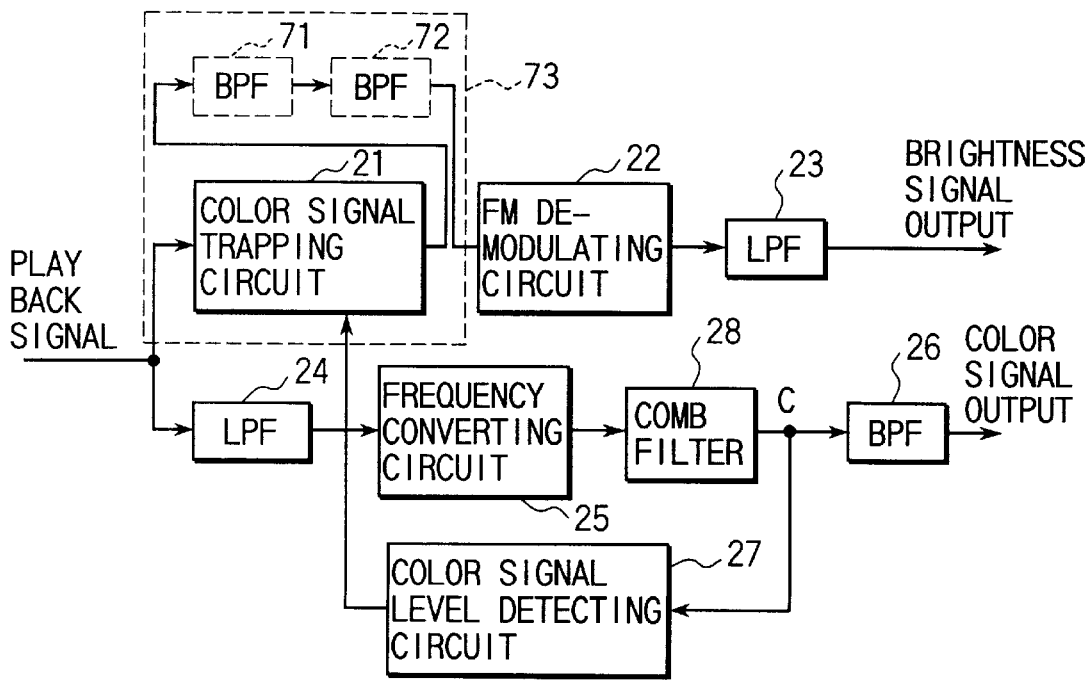
FIG. 10 is a block circuit diagram showing a modification of the circuit depicted in FIG. 2, the block circuit diagram showing part of the playback system of the video signal-processing IC of a home VTR, which employs the video signal processor according to the second embodiment of the present invention.
Figure 11:
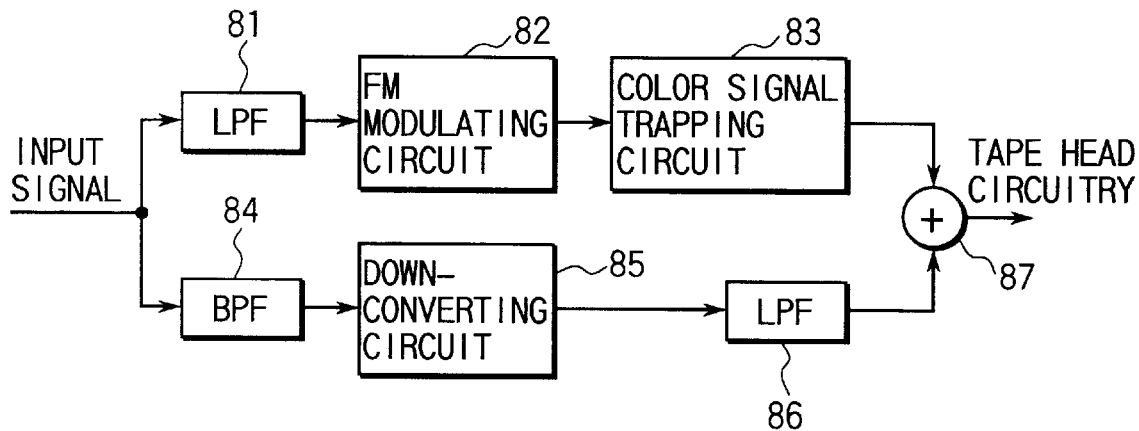
FIG. 11 is a block circuit diagram showing part of the conventional recording system included in the video signal processing IC of a home VTR.
Figure 12:
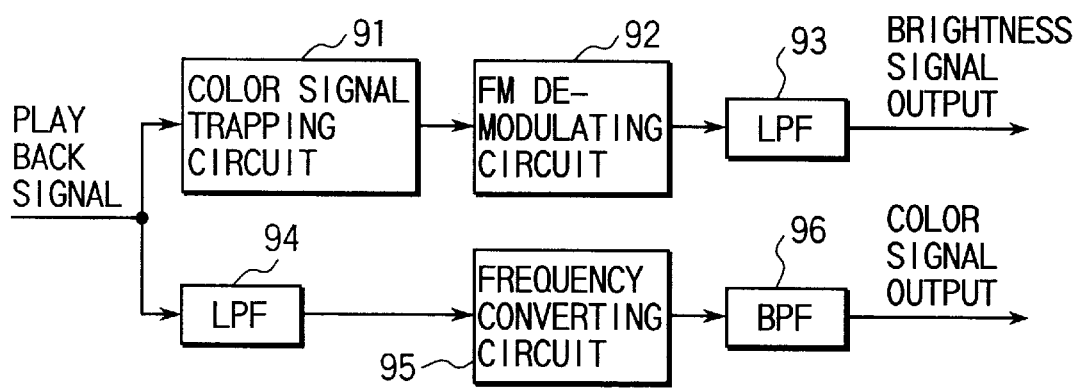
FIG. 12 is a block circuit diagram showing part of the conventional reproducing system included in the video signal processing IC of the home VTR.

In the playback system, a comb filter 28 is normally connected to the output terminal of a frequency-converting circuit 25, and a color signal output C separated by this filter may be supplied to the color signal level detecting circuit 27, as shown in FIG. 10.

In the foregoing embodiments described with reference to FIGS. 1 and 2, the frequency characteristics of the color signal trapping circuits 13 and 21 are controlled in accordance with detection outputs from the color signal level detecting circuits 17 and 27. If the color signal detection levels of the color signal level detecting circuits 17 and 27 are low, it is desirable that the high-frequency level of a luminous signal component (FM signal) be emphasized, as shown in FIG. 9. By this emphasis control, the signal is allowed to rise and fall sharply. Accordingly, the image outline becomes clear, even a very small pattern is not missing, and the image can be as vivid as possible In order to realize the emphasis control, the luminous signal processing system of the recording system employs an FM equalizer circuit 63. This FM equalizer circuit 63 is made up of an HPF 61, an LPF 62 and a color signal trapping circuit 13 (the same type as mentioned above) arranged in series in the order mentioned, as indicated by the broken lines in FIG. 9, and is connected to the output terminal of the FM modulating circuit 12. When the color signal detection level of the color signal detecting circuit 17 is low, the trapping frequency is lowered. Simultaneous with this, the gain of the HPF 61 increased at the cutoff frequency or so (i.e., the frequency range wherein the frequency of the FM signal varies greatly), as indicated by the broken lines in FIG. 7.

Likewise, the luminous signal processing system of the playback system employs an FM equalizer circuit 73. This FM equalizer circuit 73 is made up of a first BPF 71 and a second BPF 72 arranged in series, as indicated by the broken lines in FIG. 10, and is connected to the output terminal of the color signal trapping circuit 21. When the color signal detection level of the color signal detecting circuit 27 is low, the trapping frequency is lowered. Simultaneous with this, the gain of the first BPF 71 is increased at the cutoff frequency or so (i.e., the frequency range wherein the frequency of the FM signal varies greatly), as indicated by the broken lines in FIG. 10.

Each of the above embodiments was described, referring to an NTSC-type video signal whose down-converted color signal to be trapped was 629 kHz. Needless to say, however, the present invention is in no way limited to this; it is applicable to a PAL-type video signal whose down-converted color signal to be trapped is 627 kHz and to an L-SECAM type video signal whose down-converted color signal to be trapped is 1.1 kHz.

Each of the above embodiments was described, referring to a VTR which recorded or reproduced data with reference to videotape. However, the present invention is applicable to an apparatus specially designed for reproducing data from videotape, by merely adopting the structure of the playback system only. The playback characteristics in this case are similar to those of each of the above-described embodiments.

As detailed above, the video signal processor of the present invention controls the frequency characteristic of a color signal trapping circuit in accordance with the level of a color signal component, widens the band of a luminous signal component, and thereby improves the resolution. The video signal processor of the present invention is therefore suitable for use in the recording/reproducing systems of a home VTR.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video signal processor comprising:

a first filter for extracting a luminous signal component from a video signal input to a recording system of a VTR;

an FM modulating circuit for converting the luminous signal component output from the first filter into a low-frequency carrier wave FM signal component;

a color signal trapping circuit for extracting the low-frequency carrier wave FM signal component from an output signal of the FM modulating circuit, said color signal trapping circuit having a trapping frequency which varies in accordance with a control input;

a second filter for extracting a color signal component from the video signal;

a down-converting circuit for converting the color signal component output from the second filter into a down-converted color signal;

a third filter for extracting the down-converted color signal from an output signal of the down converting circuit;

a color signal level detecting circuit for detecting a level of the color signal component included in the video signal and supplying a detection output to the color signal trapping circuit as the control input; and an adder circuit for adding an output signal of the color signal trapping circuit and an output signal of the third filter together, wherein said color signal level detecting circuit converts the level of the color signal component included in the video signal into binary data, and said color signal trapping circuit has a trapping frequency which varies to a frequency of the down converted color signal or a lower frequency in accordance with the binary data output from the color signal level detecting circuit.

2. A video signal processor according to claim 1, further comprising a comb filter for separating the video signal into a luminous signal component and a color signal component, the color signal component output from the comb filter being used as the color signal component input to the color signal level detecting circuit.

3. A video signal processor according to claim 1, further comprising a fourth filter serving as a high-pass filter and inserted between an output terminal of the FM modulating circuit and the color signal trapping circuit, said fourth filter being controlled on the basis of the detection output of the color signal level detecting circuit when the color signal level detecting circuit has a low color signal component detection level such that a gain of the fourth filter increases approximately at a cutoff frequency.

4. A video signal processor according to claim 2, further comprising a fourth filter serving as a high-pass filter and inserted between an output terminal of the FM modulating circuit and the color signal trapping circuit, said fourth filter being controlled on the basis of the detection output of the color signal level detecting circuit when the color signal level detecting circuit has a low color signal component detection level such that a gain of the fourth filter increases approximately at a cutoff frequency.

5. A video signal processor comprising:

a color signal trapping circuit for extracting a low-frequency carrier wave FM signal component from a playback signal input from a playback system of a VTR, said color signal trapping circuit having a trapping frequency which varies in accordance with a control input;

an FM demodulating circuit for FM demodulating the low-frequency carrier wave FM signal component output from the color signal trapping circuit;

a first filter for extracting a luminous signal component from an output signal of the FM demodulating circuit;

a second filter for extracting a down-converted color signal from the playback signal;

a frequency converting circuit for converting an output signal of the second filter into a color signal component;

a third filter for extracting the color signal component from an output signal of the frequency converting circuit; and a color signal level detecting circuit for detecting a level of the color signal component and supplying a detection signal obtained thereby to the color signal trapping circuit as the control input, wherein said color signal level detecting circuit converts the level of the color signal component into binary data, and said color signal trapping circuit has a trapping frequency which varies to a frequency of the down-converted color signal or a lower frequency in accordance with the binary data output from the color signal level detecting circuit.

6. A video signal processor according to claim 5, further comprising a comb filter connected to an output terminal of the frequency converting circuit, a color signal component output from the comb filter being used as the color signal component input to the color signal level detecting circuit.

7. A video signal processor according to claim 5, further comprising a fourth filter serving as a band pass filter and inserted between an output terminal of the color signal trapping circuit and the FM demodulating circuit, said fourth filter being controlled on the basis of the detection output of the color signal level detecting circuit when the color signal level detecting circuit has a low color signal component detection level such that a cutoff frequency corresponding to a band of the fourth filter decreases.

8. A video signal processor according to claim 6, further comprising a fourth filter serving as a band pass filter and inserted between an output terminal of the color signal trapping circuit and the FM demodulating circuit, said fourth filter being controlled on the basis of the detection output of the color signal level detecting circuit when the color signal level detecting circuit has a low color signal component detection level such that a cutoff frequency corresponding to a band of the fourth filter decreases.

9. A video signal processor comprising:

a first filter for extracting a luminous signal component from a video signal input to a recording system of a VTR;

an FM modulating circuit for converting the luminous signal component output from the first filter into a low-frequency carrier wave FM signal component;

a first color signal trapping circuit for extracting the low-frequency carrier wave FM signal component from an output signal of the FM modulating circuit, said first color signal trapping circuit having a trapping frequency which varies in accordance with a first control input;

a second filter for extracting a color signal component from the video signal;

a down-converting circuit for converting the color signal component output from the second filter into a down-converted color signal;

a third filter for extracting the down-converted color signal from an output signal of the down converting circuit;

a first color signal level detecting circuit for detecting a level of the color signal component included in the video signal and supplying a detection output to the first color signal trapping circuit as the first control input;

an adder circuit for adding an output signal of the first color signal trapping circuit and an output signal of the third filter together;

a second color signal trapping circuit for extracting a low-frequency carrier wave FM signal component from a playback signal input from a playback system of a VTR, said second color signal trapping circuit having a trapping frequency which varies in accordance with a second control input;

an FM demodulating circuit for FM demodulating the low-frequency carrier wave FM signal component output from the second color signal trapping circuit;

a fourth filter for extracting a luminous signal component from an output signal of the FM demodulating circuit;

a fifth filter for extracting a down-converted color signal from the playback signal;

a frequency converting circuit for converting an output signal of the fifth filter into a frequency-converted color signal component;

a sixth filter for extracting the frequency converted color signal component from an output signal of the frequency converting circuit; and a second color signal level detecting circuit for detecting a level of the frequency-converted color signal component and supplying a detection signal obtained thereby to the second color signal trapping circuit as the second control input, wherein said first color signal level detecting circuit converts the level of the color signal component included in the video signal into binary data, said first color signal trapping circuit has a trapping frequency which varies to a frequency of the down converted color signal or a lower frequency in accordance with the binary data output from the first color signal level detecting circuit, said second color signal level detecting circuit converts the level of the frequency-converted color signal component into binary data, and said second color signal trapping circuit has a trapping frequency which varies to a frequency of the down-converted color signal included in the playback signal or a lower frequency in accordance with the binary data output from the second color signal level detecting circuit.

10. A video signal processor according to claim 9, further comprising a comb filter for separating the video signal into a luminous signal component and a color signal component, the color signal component output from the comb filter being used as the color signal component input to the first color signal level detecting circuit.

11. A video signal processor according to claim 9, further comprising a seventh filter serving as a high-pass filter and inserted between an output terminal of the FM modulating circuit and the first color signal trapping circuit, said seventh filter being controlled on the basis of the detection output of the first color signal level detecting circuit when the first color signal level detecting circuit has a low color signal component detection level such that a gain of the seventh filter increases approximately at a cutoff frequency.

12. A video signal processor according to claim 9, further comprising a comb filter connected to an output terminal of the frequency converting circuit, a color signal output from the comb filter being used as the color signal input to the second color signal level detecting circuit.

13. A video signal processor according to claim 9, further comprising a seventh filter serving as a band pass filter and inserted between an output terminal of the second color signal trapping circuit and the FM demodulating circuit, said seventh filter being controlled on the basis of the detection output of the second color signal level detecting circuit when the second color signal level detecting circuit has a low color signal component detection level such that a cutoff frequency corresponding to a band of the fourth filter decreases.

* * * * *